(12) United States Patent
Kuo et al.

(10) Patent No.: US 12,399,301 B2
(45) Date of Patent: *Aug. 26, 2025

(54) OPTICAL ELEMENT AND METHOD FOR MANUFACTURING OPTICAL ELEMENT

(71) Applicant: HIMAX TECHNOLOGIES LIMITED, Tainan (TW)

(72) Inventors: Han Yi Kuo, Tainan (TW); Shu-Hao Hsu, Tainan (TW); Yin Tung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 302 days.

This patent is subject to a terminal disclaimer.

(21) Appl. No.: 18/057,233

(22) Filed: Nov. 21, 2022

(65) Prior Publication Data

US 2024/0045104 A1 Feb. 8, 2024

Related U.S. Application Data

(63) Continuation-in-part of application No. 17/817,346, filed on Aug. 3, 2022, now Pat. No. 11,926,113.

(60) Provisional application No. 63/374,003, filed on Aug. 31, 2022.

(51) Int. Cl.
| | |
|---|---|
| G02B 6/136 | (2006.01) |
| B29D 11/00 | (2006.01) |
| B32B 7/023 | (2019.01) |
| B32B 7/12 | (2006.01) |
| B32B 17/10 | (2006.01) |
| G02B 1/04 | (2006.01) |
| G02B 1/12 | (2006.01) |

(52) U.S. Cl.
CPC .......... *G02B 1/041* (2013.01); *B29D 11/0073* (2013.01); *B32B 7/023* (2019.01); *B32B 7/12* (2013.01); *B32B 17/10* (2013.01); *G02B 1/12* (2013.01); *B32B 2307/412* (2013.01); *B32B 2307/418* (2013.01); *B32B 2551/00* (2013.01); *G02B 6/136* (2013.01)

(58) Field of Classification Search
None
See application file for complete search history.

(56) References Cited

U.S. PATENT DOCUMENTS

| | | |
|---|---|---|
| 6,113,801 A | 9/2000 | Savant et al. |
| 10,444,422 B2 | 10/2019 | Xu et al. |
| 10,591,133 B2 | 3/2020 | Miyazaki et al. |

(Continued)

FOREIGN PATENT DOCUMENTS

| | | |
|---|---|---|
| EP | 0297437 B1 | 9/1993 |
| JP | H10-006668 A | 1/1998 |

(Continued)

*Primary Examiner* — Shamim Ahmed
(74) *Attorney, Agent, or Firm* — CKC & Partners Co., LLC

(57) ABSTRACT

An optical element and a method for manufacturing the optical element are described. The optical element includes a light penetrating substrate, an optical layer, and an adhesive layer. The optical layer is located on a surface of the light penetrating substrate. The optical layer has a first surface and a second surface, which are opposite to each other. The first surface is set with various diffracting optical structures. A refractive index of the optical layer is ranging from substantially 1 to substantially 4. The adhesive layer is sandwiched between the surface of the light penetrating substrate and the second surface of the optical layer.

20 Claims, 18 Drawing Sheets

(56) References Cited

U.S. PATENT DOCUMENTS

| | | |
|---|---|---|
| 2005/0073747 A1 | 4/2005 | Suzudo |
| 2009/0176060 A1 | 7/2009 | Taniguchi |
| 2011/0039099 A1 | 2/2011 | Sherman et al. |
| 2015/0331188 A1 | 11/2015 | Maeda et al. |
| 2017/0365818 A1 | 12/2017 | Wolk et al. |
| 2018/0074234 A1 | 3/2018 | Chen et al. |
| 2018/0164475 A1 | 6/2018 | Meyer et al. |
| 2019/0129088 A1 | 5/2019 | Lu et al. |
| 2019/0346108 A1 | 11/2019 | Miyazaki et al. |
| 2021/0157041 A1 | 5/2021 | Olkkonen et al. |
| 2022/0033690 A1 | 2/2022 | Otake et al. |
| 2022/0403245 A1 | 12/2022 | Shiraiwa et al. |

FOREIGN PATENT DOCUMENTS

| | | |
|---|---|---|
| JP | H10-051589 A | 2/1998 |
| JP | H10-177107 A | 6/1998 |
| JP | 2005-338638 A | 12/2005 |
| JP | 2017-126064 A | 7/2017 |
| KR | 101251344 B1 | 4/2013 |
| TW | 200720091 A | 6/2007 |
| TW | 201105762 A | 2/2011 |

OPTICAL ELEMENT AND METHOD FOR MANUFACTURING OPTICAL ELEMENT

CROSS-REFERENCE TO RELATED APPLICATIONS

The present application is a Continuation-in-part of U.S. application Ser. No. 17/817,346, filed Aug. 3, 2022, now U.S. Pat. No. 11,926,113, issued on Mar. 12, 2024 and also claims priority to U.S. Provisional Application Ser. No. 63/374,003, filed Aug. 31, 2022, all of which are herein incorporated by reference.

BACKGROUND

Field of Invention

The present disclosure relates to an optical technique. More particularly, the present disclosure relates to an optical element and a method for manufacturing the optical element.

Description of Related Art

In the optical field, the using of optical elements with high diffraction angles enables optical devices to have better optical performance. In a convention method for manufacturing an optical element, a glue layer is firstly formed on a light penetrating substrate, and diffracting optical structures are directly imprinted in the glue layer. Thus, the refraction and the diffraction are limited by a refractive index of the glue layer.

SUMMARY

Therefore, one objective of the present disclosure is to provide an optical element and a method for manufacturing the optical element, in which various diffracting optical structures are formed on an optical layer, which is made from a high refractive index material, such that the optical element with a higher diffraction angle is obtained.

According to the above objectives, the present disclosure provides an optical element. The optical element includes a light penetrating substrate, an optical layer, and an adhesive layer. The optical layer is located on a surface of the light penetrating substrate. The optical layer has a first surface and a second surface, which are opposite to each other. The first surface is set with various diffracting optical structures. A refractive index of the optical layer is equal to or greater than 1.4. The adhesive layer is sandwiched between the surface of the light penetrating substrate and the second surface of the optical layer.

According to one embodiment of the present disclosure, the adhesive layer includes an optically clear adhesive.

According to one embodiment of the present disclosure, the adhesive layer includes a pressure sensitive adhesive.

According to one embodiment of the present disclosure, a refractive index of the adhesive layer is ranging from substantially 1 to substantially 4.

According to the above objectives, the present disclosure further provides a method for manufacturing an optical element. In this method, a carrier is provided. A mold layer is formed on the carrier. The mold layer has a first surface and a second surface, which are opposite to each other. The first surface is adjacent to the carrier, and the second surface is set with various microstructures. An anti-sticking treatment is performed on the second surface of the mold layer. An optical layer is formed on the second surface of the mold layer after performing the anti-sticking treatment. The optical layer covers and fills the microstructures. A light penetrating substrate is adhered to the optical layer using an adhesive layer. The optical layer and the light penetrating substrate are respectively located on two opposite sides of the adhesive layer. The carrier is removed from the carrier. The mold layer is removed from the optical layer.

According to one embodiment of the present disclosure, forming the mold layer on the carrier includes coating a glue layer on the carrier, and forming the microstructures on a surface of the glue layer to form the mold layer.

According to one embodiment of the present disclosure, forming the microstructures on the surface of the glue layer includes performing an imprinting step on the surface of the glue layer to press an imprinting mold on the surface of the glue layer, curing the glue layer when the imprinting mold is pressed on the surface of the glue layer, and removing the imprinting mold.

According to one embodiment of the present disclosure, curing the glue layer includes performing an ultraviolet light (UV) exposure treatment, an ultraviolet light exposure with thermal curing treatment, or a thermal curing treatment.

According to one embodiment of the present disclosure, between providing the carrier and forming the mold layer, the method further includes attaching a bonding layer to a surface of the carrier, the mold layer is formed on the bonding layer, and removing the mold layer from the optical layer comprises performing a heating step, a laser ablation step, and/or an etching step on the bonding layer and the mold layer.

According to one embodiment of the present disclosure, between providing the carrier and forming the mold layer, the method further includes attaching a bonding layer to a surface of the carrier, the mold layer is formed on the bonding layer, and removing the mold layer from the optical layer includes performing a chemical soaking step to remove the bonding layer and the mold layer.

According to one embodiment of the present disclosure, performing the anti-sticking treatment includes depositing an anti-sticking material on the second surface of the mold layer, or performing a surface modification treatment on the second surface of the mold layer.

According to one embodiment of the present disclosure, forming the optical layer includes using an atomic layer deposition method, an etching method, a sputtering method, an evaporation method, an imprinting method, or a spin coating method.

According to one embodiment of the present disclosure, a refractive index of the optical layer is ranging from substantially 1 to substantially 4.

According to one embodiment of the present disclosure, between forming the optical layer and adhering the light penetrating substrate to the optical layer, the method further includes performing a plasma cleaning step on the optical layer.

According to one embodiment of the present disclosure, performing the plasma cleaning step includes using an oxygen plasma. The cleaning method is not limited thereto.

According to one embodiment of the present disclosure, adhering the light penetrating substrate to the optical layer using the adhesive layer includes adhering the adhesive layer to the optical layer, and adhering the transparent substrate to the adhesive layer.

According to one embodiment of the present disclosure, the adhesive layer includes a pressure sensitive adhesive.

According to one embodiment of the present disclosure, adhering the light penetrating substrate to the optical layer using the adhesive layer includes coating an optically clear adhesive on the optical layer to form the adhesive layer, and adhering the light penetrating substrate to the adhesive layer.

According to one embodiment of the present disclosure, removing the carrier from the mold layer includes performing a heat treatment to reduce a bonding force between the carrier and the mold layer, and separating the carrier and the mold layer.

According to one embodiment of the present disclosure, removing the carrier from the mold layer includes performing a laser ablation on a bonding layer, in which the bonding layer is disposed between the carrier and the mold layer.

According to one embodiment of the present disclosure, removing the carrier from the mold layer includes performing an etching step on the carrier to reduce the carrier.

According to one embodiment of the present disclosure, removing the mold layer from the optical layer includes performing an etching step on the mold layer.

According to one embodiment of the present disclosure, removing the mold layer from the optical layer includes performing a chemical soaking step to remove the mold layer.

According to one embodiment of the present disclosure, before forming the mold layer on the carrier, the method further includes performing a plasma cleaning step on the carrier.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

DETAILED DESCRIPTION

Figure 1:
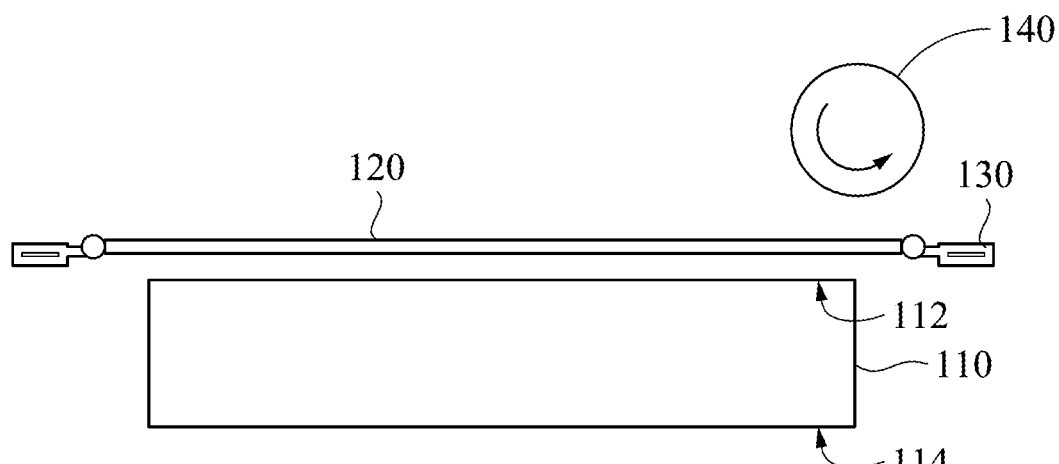
FIG. 1 through FIG. 9, FIG. 10A, FIG. 11, FIG. 12A, FIG. 13, FIG. 14, FIG. 15A, and FIG. 16 are schematic diagrams of intermediate stages in a method for manufacturing of an optical element in accordance with one embodiment of the present disclosure.

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired.

In addition, the terms "first", "second", and the like, as used herein, are not intended to mean a sequence or order, and are merely used to distinguish elements or operations described in the same technical terms.

The spatial relationship between two elements described in the present disclosure applies not only to the orientation depicted in the drawings, but also to the orientations not represented by the drawings, such as the orientation of the inversion. Moreover, the terms "connected", "electrically connected", or the like between two components referred to in the present disclosure are not limited to the direct connection or electrical connection of the two components, and may also include indirect connection or electrical connection as required.

Referring to FIG. 1 through FIG. 9, FIG. 10A, FIG. 11, FIG. 12A, FIG. 13, FIG. 14, FIG. 15A, and FIG. 16, which are schematic diagrams of intermediate stages in a method for manufacturing of an optical element in accordance with one embodiment of the present disclosure. In the manufacturing of an optical element 100 shown in FIG. 16, a carrier 110 may be firstly provided, as shown in FIG. 1. The carrier 110 may be a flat plate. For example, the carrier 110 has two opposite surfaces 112 and 114, in which at least the surface 112 is a flat surface. The carrier 110 may be a glass flat plate. For example, a thickness of the carrier 110 may be 300 μm.

Figure 2:
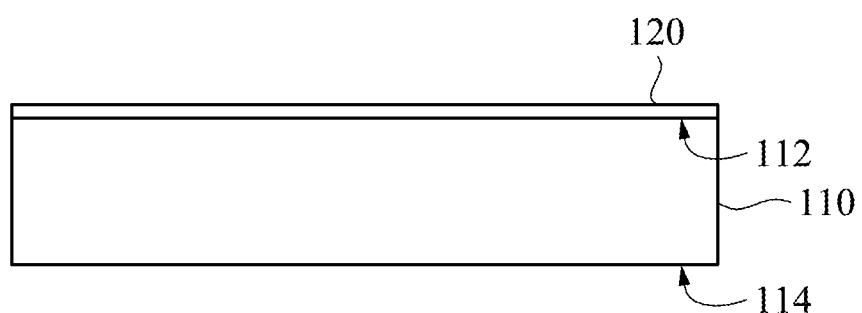

Next, a bonding layer 120 may be adhered to the surface 112 of the carrier 110, as shown in FIG. 2. The surface 112 of the carrier 110 is a flat surface, such that the bonding layer 120 can be smoothly adhered to the surface 112. Referring to FIG. 1 again, in some examples, the bonding layer 120 is held by a clamping apparatus 130. Then, the bonding layer 120 may be pressed onto the surface 112 of the carrier 110 by using, for example, a roller 140. The bonding layer 120 may be an adhesive tape.

Figure 6:
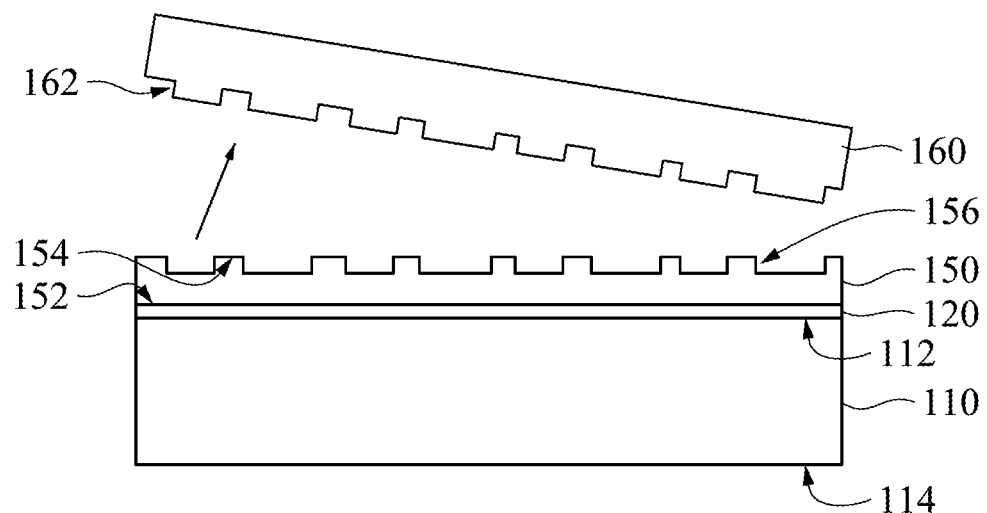

After the bonding layer 120 is adhered to the carrier 110, a mold layer 150 shown in FIG. 6 may be formed on the bonding layer 120. The mold layer 150 has a first surface 152 and a second surface 154, in which the first surface 152 and the second surface 154 are opposite to each other. The first surface 152 is adjacent to the bonding layer 120. For example, the first surface 152 may directly contact with the bonding layer 120. The second surface 154 is set with microstructures 156.

Figure 3:
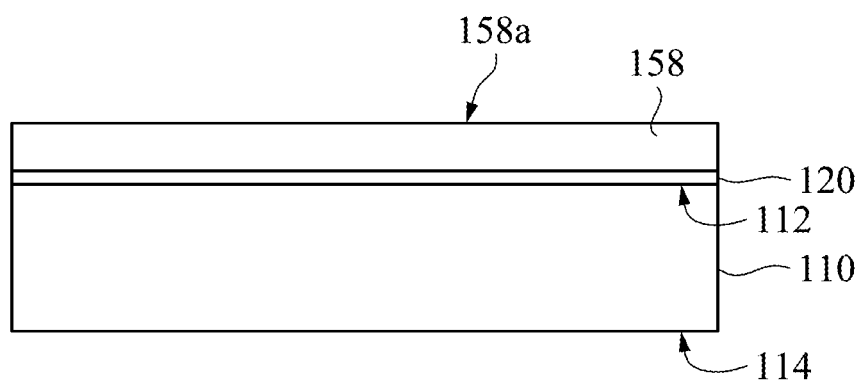
Figure 4:
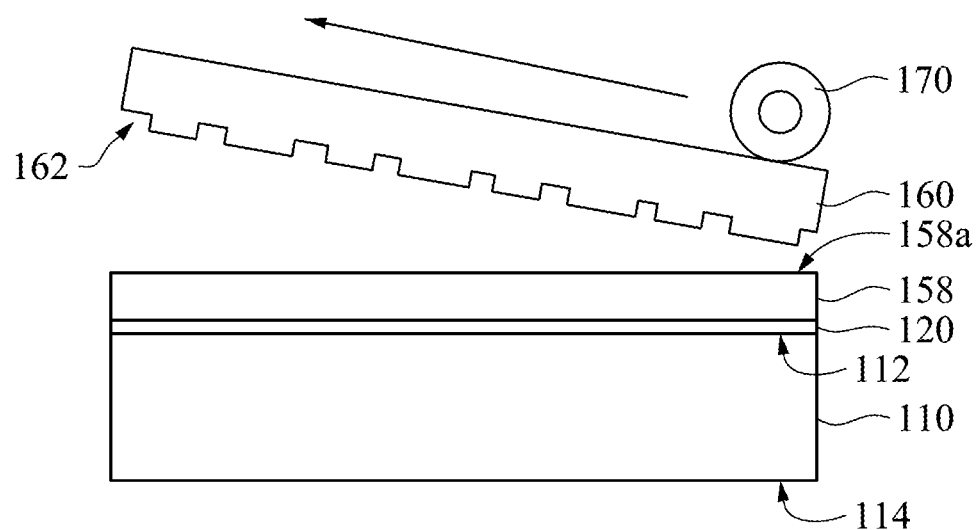
Figure 5:
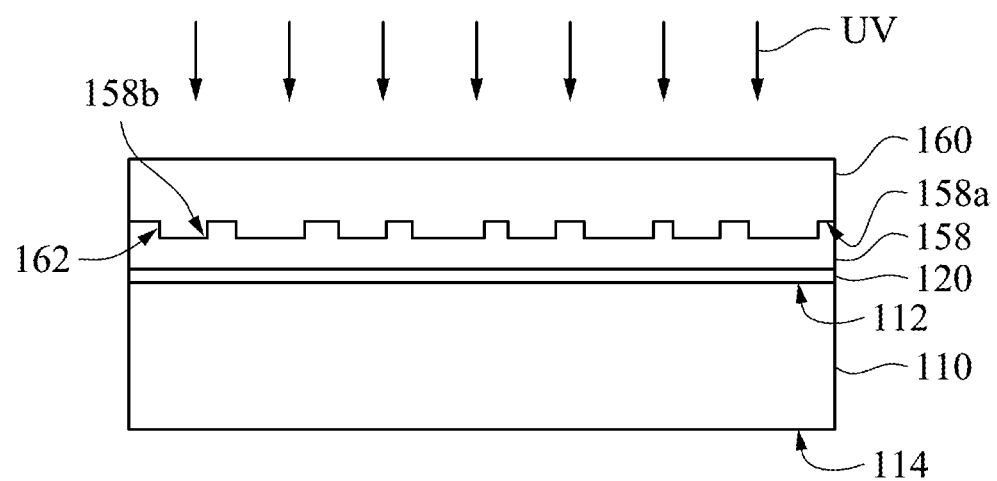

In some examples, in the formation of the mold layer 150, a glue layer 158 is coated on the bonding layer 120, as shown in FIG. 3. For example, the glue layer 158 may be formed on the bonding layer 120 by using a spin coating method. Then, the microstructures 156 are formed on a surface 158a of the glue layer 158, such that the mold layer 150 with the microstructures 156 is formed. That is the mold layer 150 is composed of the glue layer 158. In some examples, in the forming of the microstructures 156, an imprinting step is performed on the surface 158a of the glue layer 158 by using an imprinting mold 160. The imprinting mold 160 includes a pattern structure 162. In the imprinting step, as shown in FIG. 4 and FIG. 5, the imprinting mold 160 is pressed on the surface 158a of the glue layer 158 while the glue layer 158 has not been hardened, such that a portion of the glue layer 158 is embedded in the pattern structure 162. The imprinting step may be performed by using a roller 170 to press the imprinting mold 160 onto the surface 158a of the glue layer 158.

In some examples, as shown in FIG. 5, when the imprinting mold 160 is pressed on the surface 158a of the glue layer 158, the glue layer 158 is cured to maintain a shape of the surface 158a of the glue layer 158. Thus, after curing, a pattern structure 158b, which is opposite to the pattern structure 162 of the imprinting mold 160, is formed on the surface 158a of the glue layer 158. In some exemplary examples, the glue layer 158 is cured by using an ultraviolet light UV to perform an ultraviolet light exposure treatment on the glue layer 158. In the example that the glue layer 158 is cured by using the ultraviolet light UV, the imprinting mold 160 is transparent to the ultraviolet light UV. Alternatively, the glue layer 158 is cured by using an ultraviolet light UV to perform with a thermal curing treatment on the glue layer 158. The glue layer 158 may be cured by performing a thermal curing treatment on the glue layer 158. A material of the imprinting mold 160 may be, for example, resin polymer, metal, or oxide, but the material of the imprinting mold 160 is not limited thereto. Then, as shown in FIG. 6, the imprinting mold 160 is removed to complete the formation the microstructures 156 of the mold layer 150.

Figure 7:
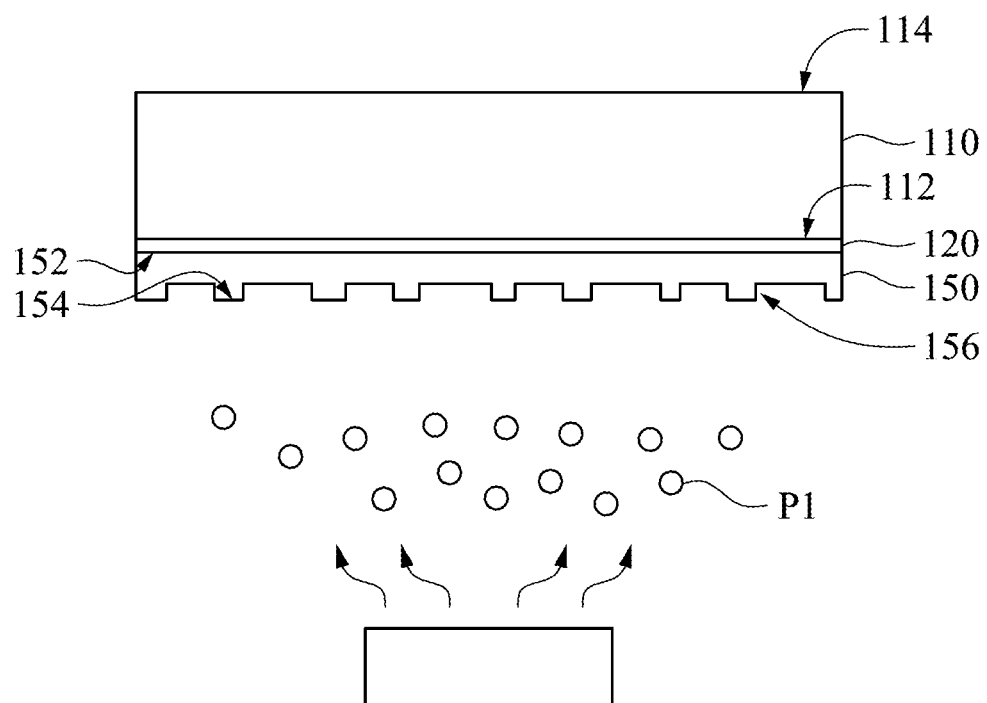

After the mold layer 150 is formed, an anti-sticking treatment may be performed on the second surface 154 of the mold layer 150. In some examples, as shown in FIG. 7, in the anti-sticking treatment, the stacked structure including the carrier 110, the bonding layer 120, and the mold layer 150 is flipped, and an anti-sticking material P1 is deposited on the second surface 154 of the mold layer 150 by using, for example, an evaporation method. In another example, in the anti-sticking treatment, a surface modification treatment is performed on the second surface 154 of the mold layer 150 to make the second surface 154 have an anti-sticking property. The surface modification treatment may be performed by using plasma.

Figure 8:
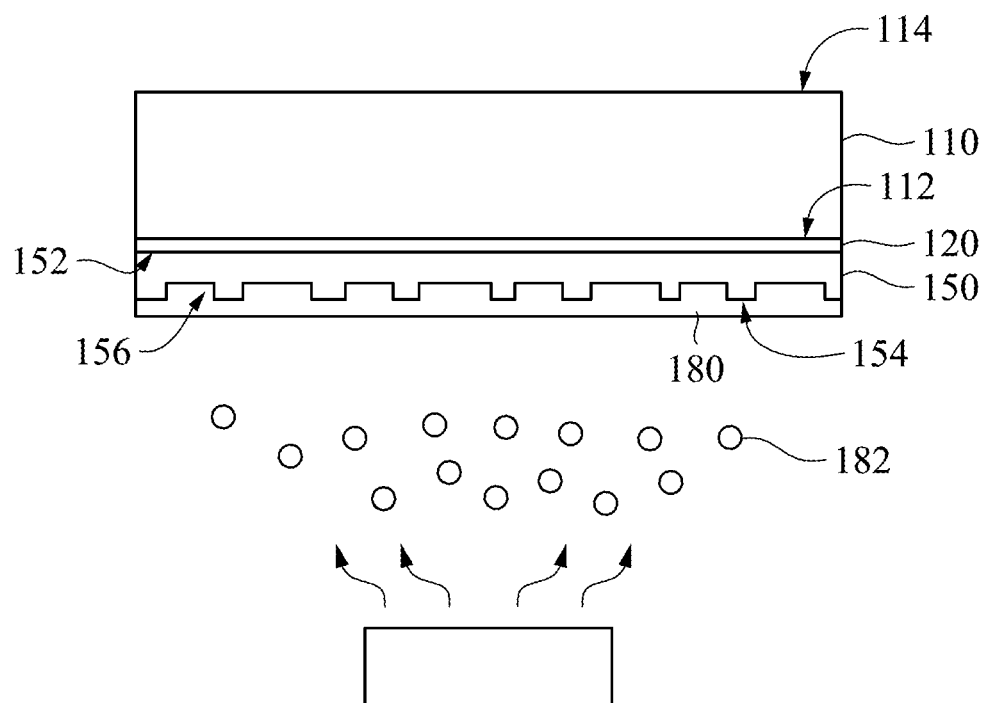

After performing the anti-sticking treatment, the optical layer 180 may be formed on the second surface 154 of the mold layer 150 by using, for example, an atomic layer deposition method, a sputtering method, an evaporation method, an imprinting method, or a spin coating method. The optical layer 180 covers the microstructures 156 of the mold layer 150 and fills the microstructures 156, such that a surface structure, which is opposite to a topographical structure of the second surface 154 of the mold layer 150, is formed on the optical layer 180. In some exemplary examples, as shown in FIG. 8, an optical material 182 is deposited on the second surface 154 of the mold layer 150 to form the optical layer 180 on the second surface 154. The optical layer 180 is formed from a high refractive index material. For example, a refractive index of the optical layer 180 may be ranging from substantially 1 to substantially 4.

Figure 9:
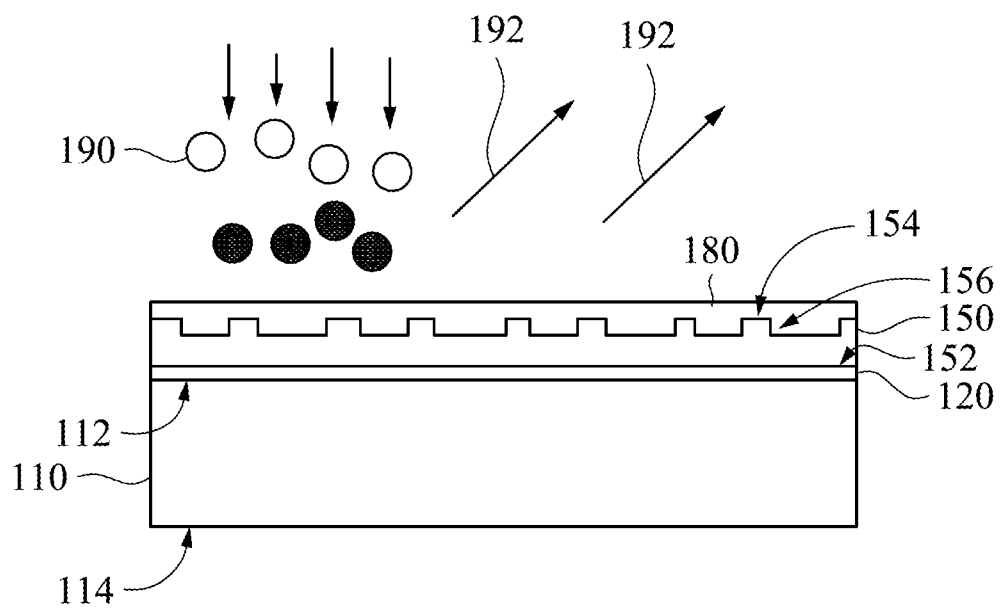

In some examples, after the optical layer 180 is formed, the stacked structure including the carrier 110, the bonding layer 120, the mold layer 150, and the optical layer 180 is flipped. Then, as shown in FIG. 9, a plasma cleaning step may be optionally performed on the optical layer 180 to use a plasma 190 to clean the optical layer 180. For example, the plasma 190 may be an oxygen plasma. During the plasma cleaning step, products 192 are pumped out. The products 192 may be $H_2O$ and/or $CO_2$.

Figure 11:
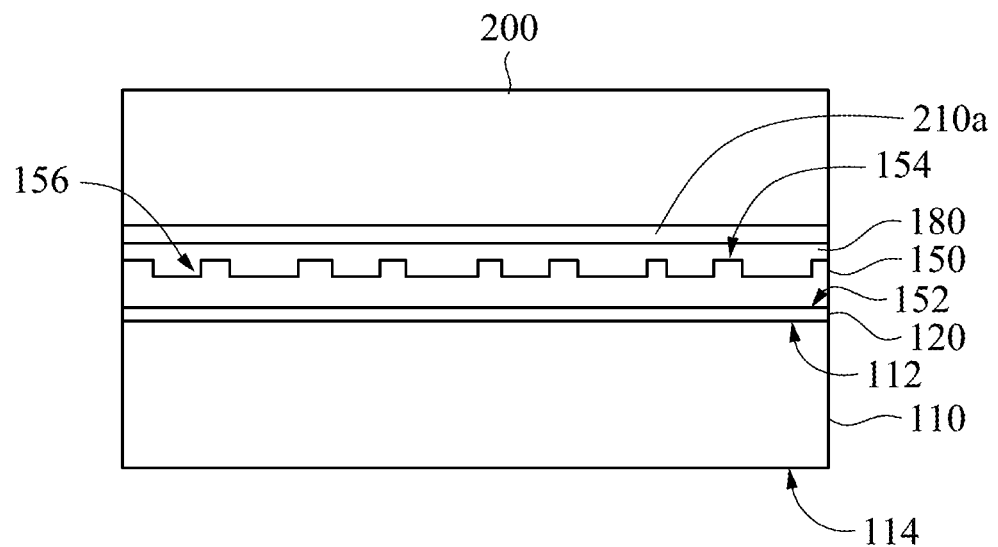

Next, as shown in FIG. 11, a light penetrating substrate 200 may be adhered to the optical layer 180 by using an adhesive layer 210a, such that the optical layer 180 and the light penetrating substrate 200 are respectively located on two opposite sides of the adhesive layer 210a. The light penetrating substrate 200 is a substrate with a high refractive index. In some exemplary examples, the light penetrating substrate 200 may be a glass substrate or a fused silica substrate.

Figure 10A:
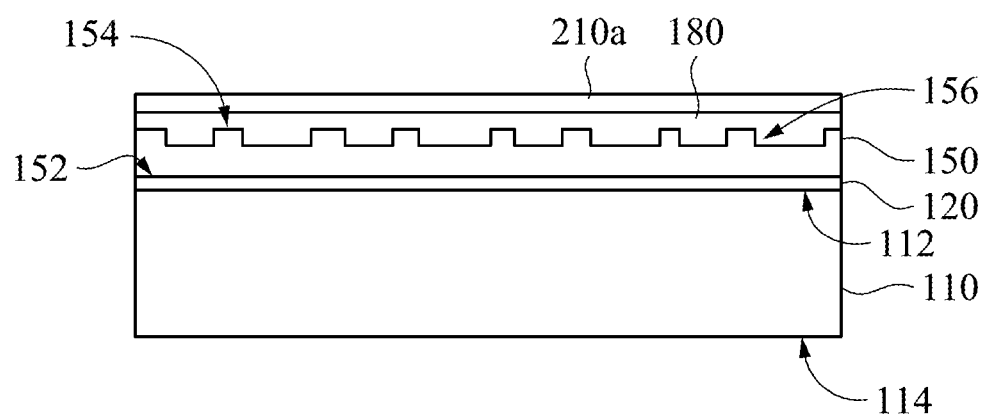

In some examples, as shown in FIG. 10A, in the operation of adhering the light penetrating substrate 200 to the optical layer 180, the adhesive layer 210a is adhered to the optical layer 180, and then the light penetrating substrate 200 is placed on and is adhered to the adhesive layer 210a. In such examples, the adhesive layer 210a is a double-sided tape. The adhesive layer 210a may include a pressure sensitive adhesive. The adhesive layer 210a is transparent. A haze of the adhesive layer 210a may be, for example, smaller than 0.5%, but the present embodiment is not limited thereto. In some exemplary examples, a material of the adhesive layer 210a is a high refractive index material. For example, a refractive index of the adhesive layer 210a may be ranging from substantially 1 to substantially 4.

Figure 10B:
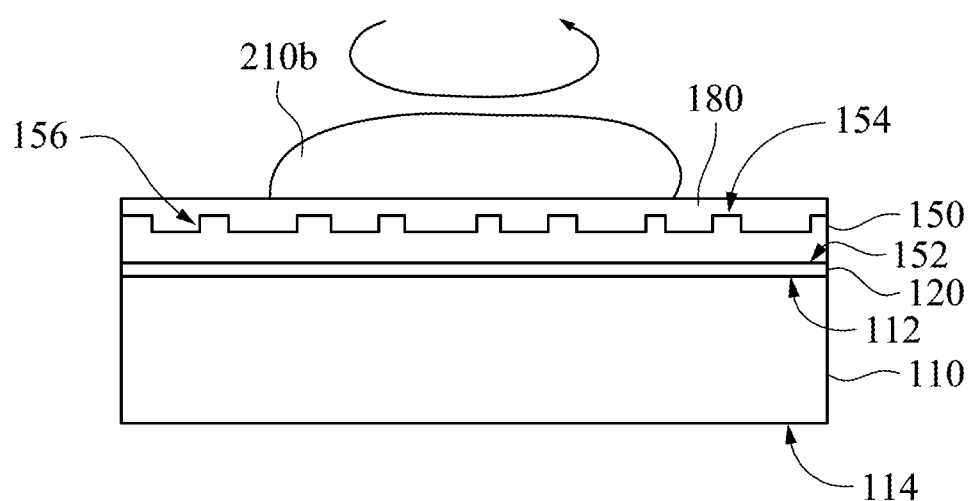
FIG. 10B is a schematic diagram showing forming an adhesive layer on an optical layer in accordance with another embodiment of the present disclosure.

In some examples, as shown in FIG. 10B, in the operation of adhering the light penetrating substrate 200 to the optical layer 180, an optically clear adhesive 210b is coated on the optical layer 180 to form the adhesive layer. The optically clear adhesive 210b may be formed on the optical layer 180 by a spin coating method. Next, the light penetrating substrate 200 is placed on and is adhered to the adhesive layer composed of the optically clear adhesive 210b. A haze of the optically clear adhesive 210b may be, for example, smaller than 0.5%, but the present embodiment is not limited thereto. In some exemplary examples, a material of the optically clear adhesive 210b is a high refractive index material. For example, a refractive index of the optically clear adhesive 210b may be ranging from substantially 1 to substantially 4.

Figure 12A:
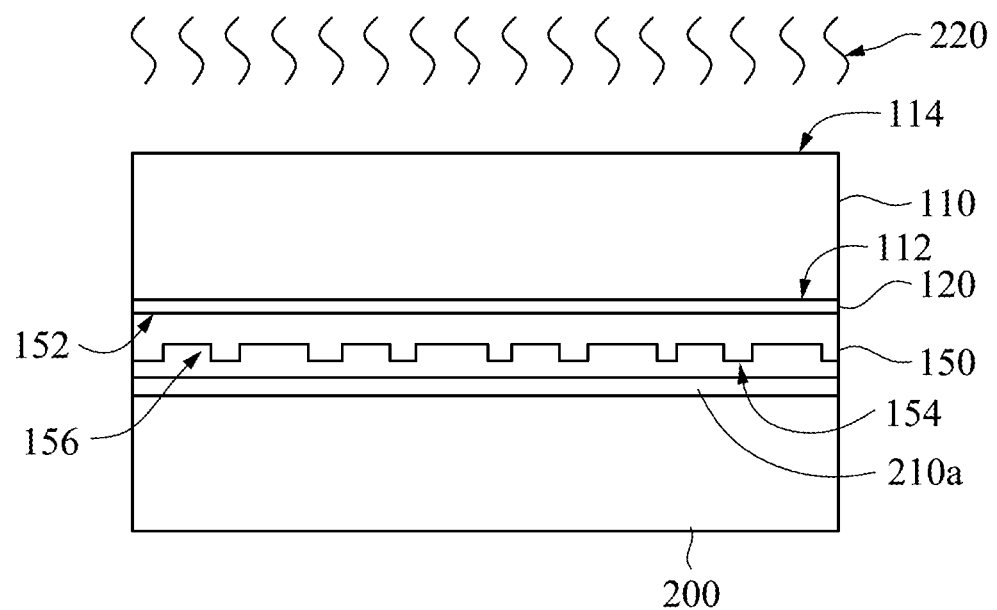
Figure 12B:
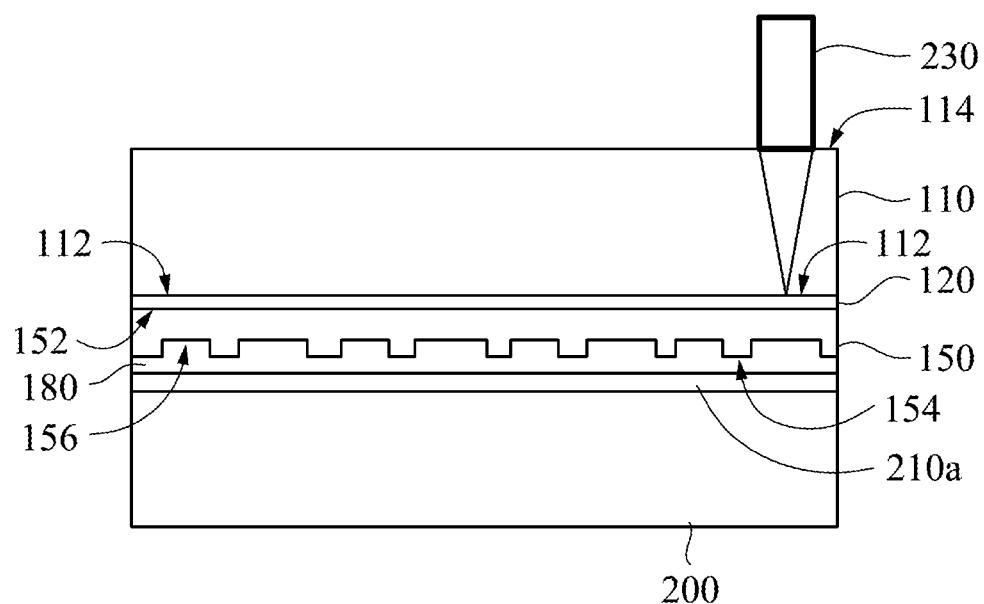
FIG. 12B is a schematic diagram showing performing a laser ablation step on a bonding layer in accordance with another embodiment of the present disclosure.
Figure 12C:
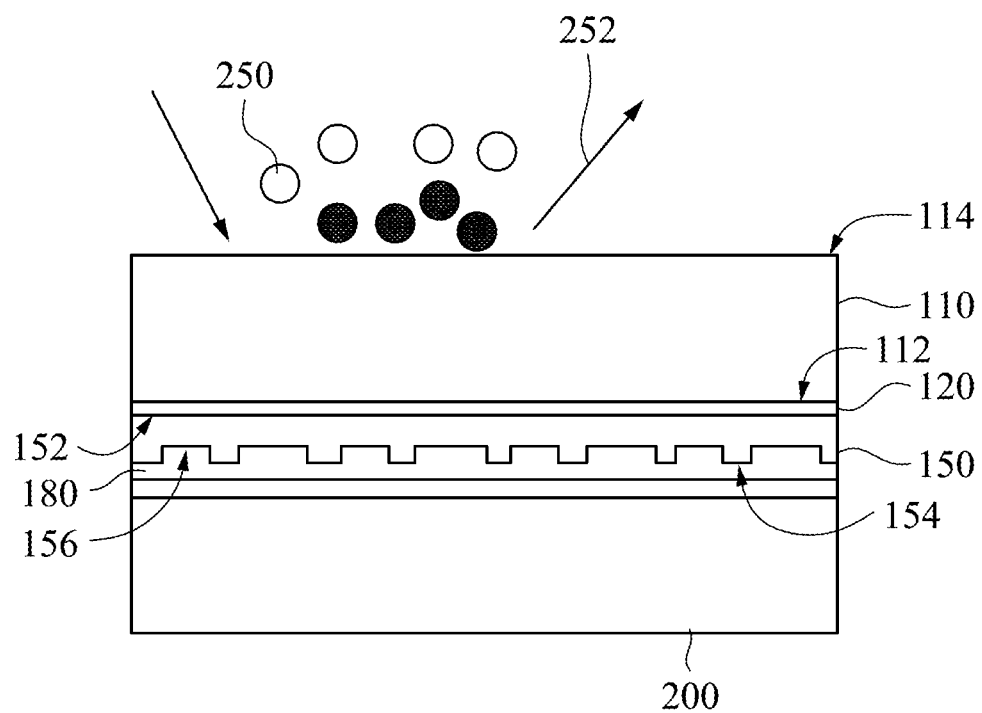
FIG. 12C is a schematic diagram showing performing an etching step on a carrier in accordance with still another embodiment of the present disclosure.
Figure 13:
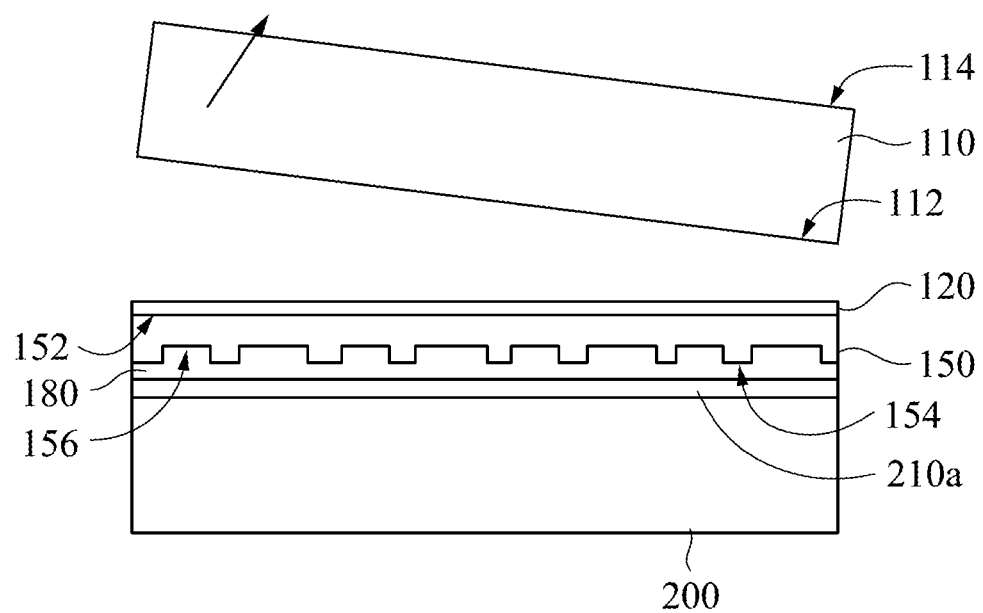

Then, as shown in FIG. 13, the carrier 110 is removed from the bonding layer 120. In some examples, as shown in FIG. 12A, in the operation of removing the carrier 110, a heat treatment 220 is performed to reduce a bonding force between the carrier 110 and the bonding layer 120. Thus, after the heat treatment 220, the carrier 110 and the bonding layer 120 can be separated from each other easier. In another example, as shown in FIG. 12B, in the operation of removing the carrier 110, a laser ablation step is firstly performed on the bonding layer 120 by using a laser device 230, such that the carrier 110 and the bonding layer 120 can be separated from each other successfully. In still another example, as shown in FIG. 12C, in the operation of removing the carrier 110, an etching step is performed on the carrier 110 by using an etchant 250 to reduce the carrier 110 until the carrier 110 is removed. In the examples that the carrier 110 is formed from silicon dioxide ($SiO_2$), the etchant 250 may be hydrogen fluoride (HF), and products 252 generated during the etching step is silicon fluoride ($SiF_4$) and water ($H_2O$). In the examples that the carrier 110 is formed from calcium metasilicate ($CaSiO_3$), the etchant 250 may be hydrogen fluoride, and the products 252 silicon fluoride, water, and calcium fluoride ($CaF_2$).

Figure 14:
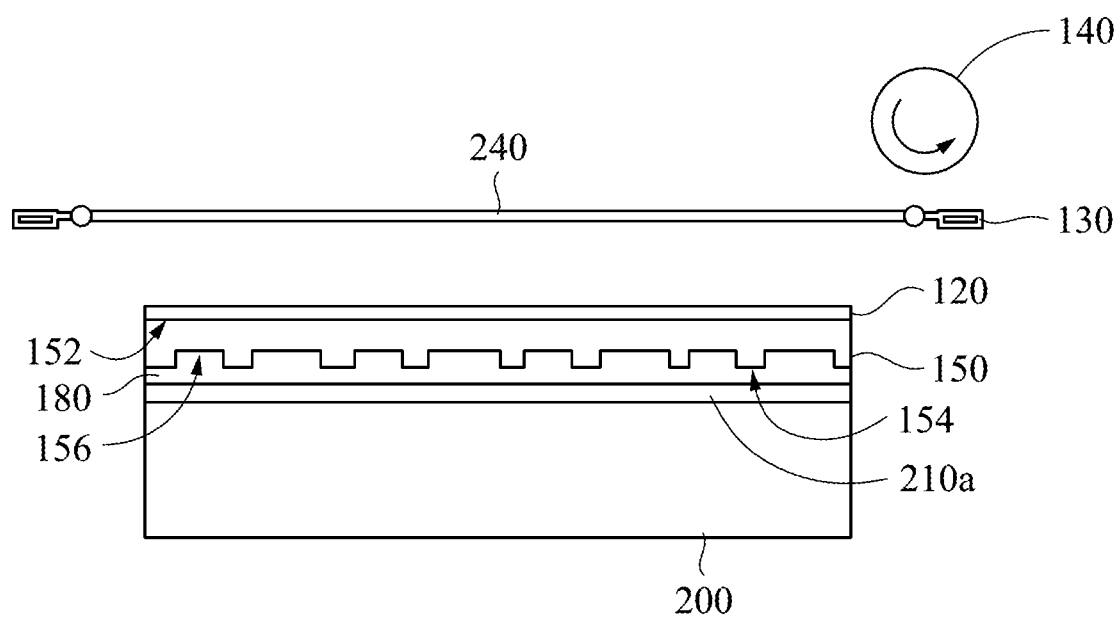
Figure 15A:
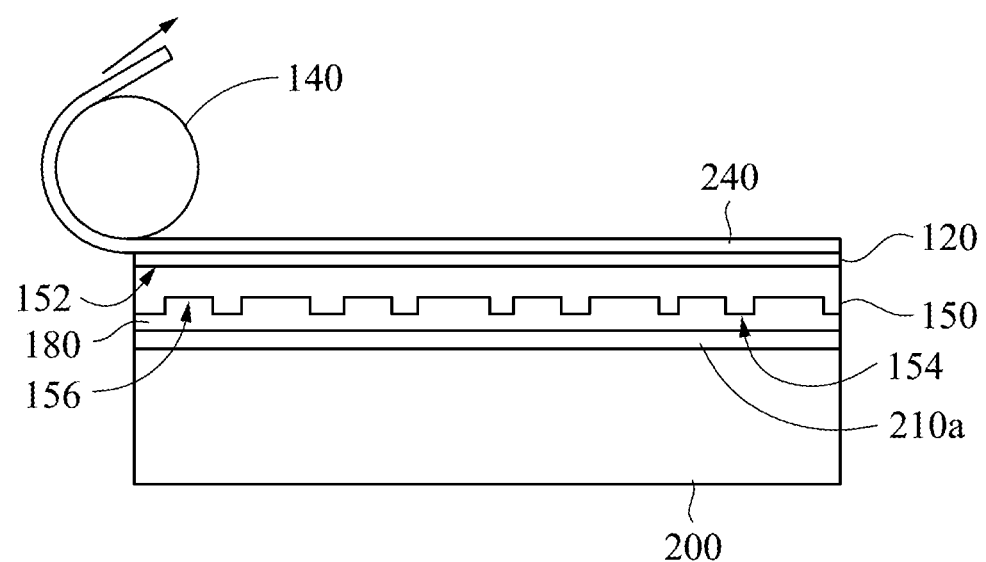
Figure 16:
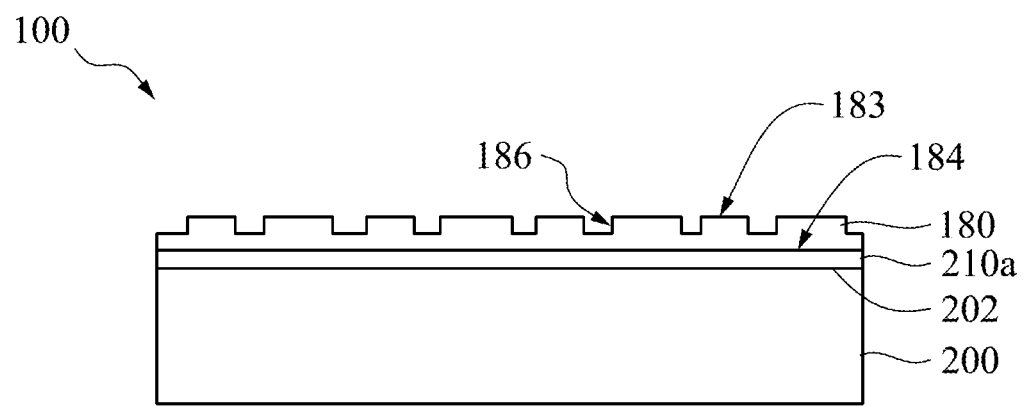
Figure 17:
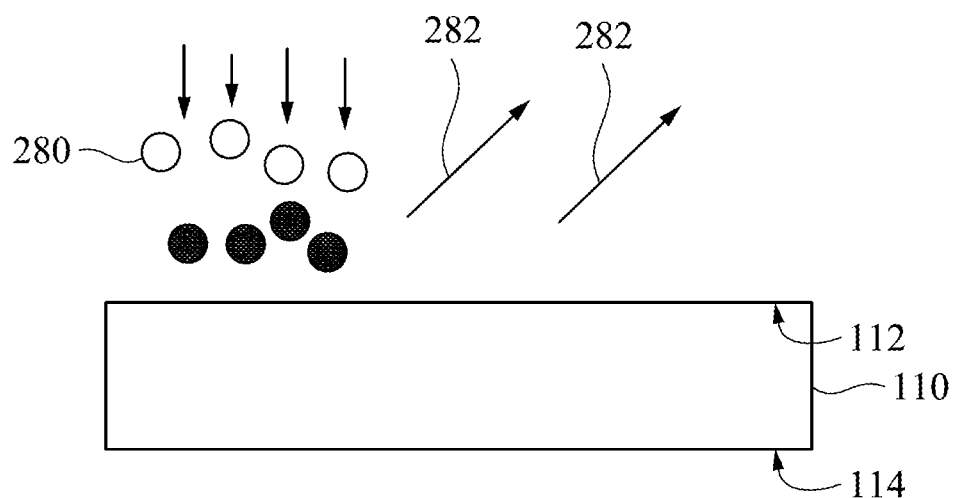
FIG. 17 through FIG. 24, FIG. 25A, FIG. 26, FIG. 27A, and FIG. 28A are schematic diagrams of intermediate stages in a method for manufacturing of an optical element in accordance with one embodiment of the present disclosure.

After the carrier 110 is removed, the bonding layer 120 and the mold layer 150 may be removed from the optical layer 180. The bonding layer 120 and the mold layer 150 may be removed simultaneously. For example, in the operation of removing the bonding layer 120 and the mold layer 150, as shown in FIG. 14, an adhesive tape 240 may be adhered to the bonding layer 120. In some examples, the adhesive tape 240 may be held by the clamping apparatus 130. Then, the adhesive tape 240 may be pressed onto the bonding layer 120 by using the roller 140. Sequentially, as shown in FIG. 15A and FIG. 16, the bonding layer 120 and the mold layer 150 may be pulled by using the adhesive tape 240, so as to complete the formation of the optical element 100.

The anti-sticking treatment has been performed on the second surface 154 of the mold layer 150, such that a bonding force between the second surface 154 of the mold layer 150 and the optical layer 180 is smaller than a bonding surface between the first surface 152 of the mold layer 150 and the bonding layer 120. Therefore, the mold layer 150 can be separated from the optical layer 180 successfully, and the bonding layer 120 and the mold layer 150 can be easily pulled away.

Figure 15B:
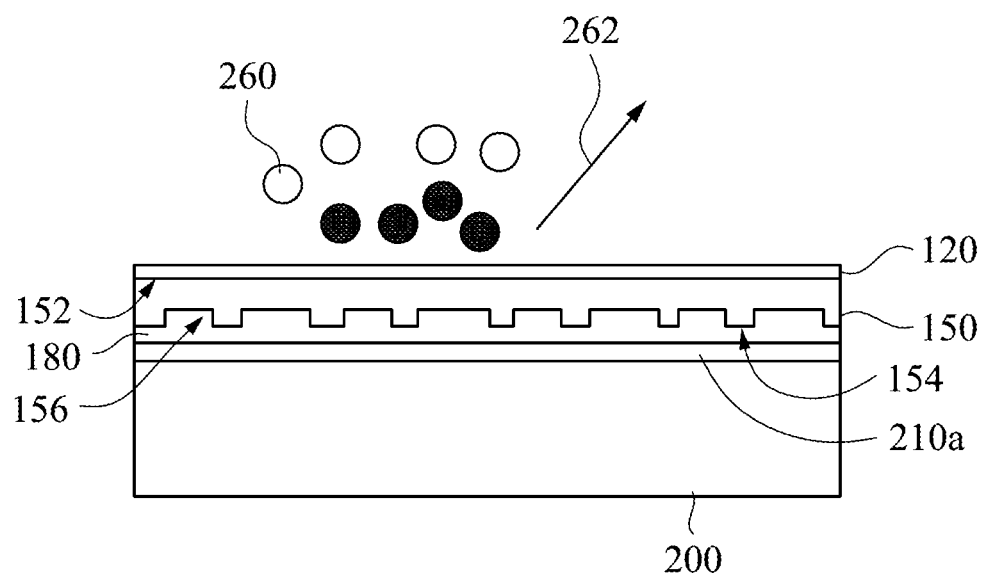
FIG. 15B is a schematic diagram showing performing an etching step on a bonding layer and a mold layer in accordance with another embodiment of the present disclosure.

In another examples, as shown in FIG. 15B, in the operation of removing the bonding layer 120 and the mold layer 150, an etching step is performed on the bonding layer 120 and the mold layer 150 by using an etchant 260 to etch away the bonding layer 120 and the mold layer 150. For example, the etchant 260 may include argon ($Ar_2$) and chlorine ($Cl_2$). During the etching step, some products 262 are generated and are pumped out.

Figure 15C:
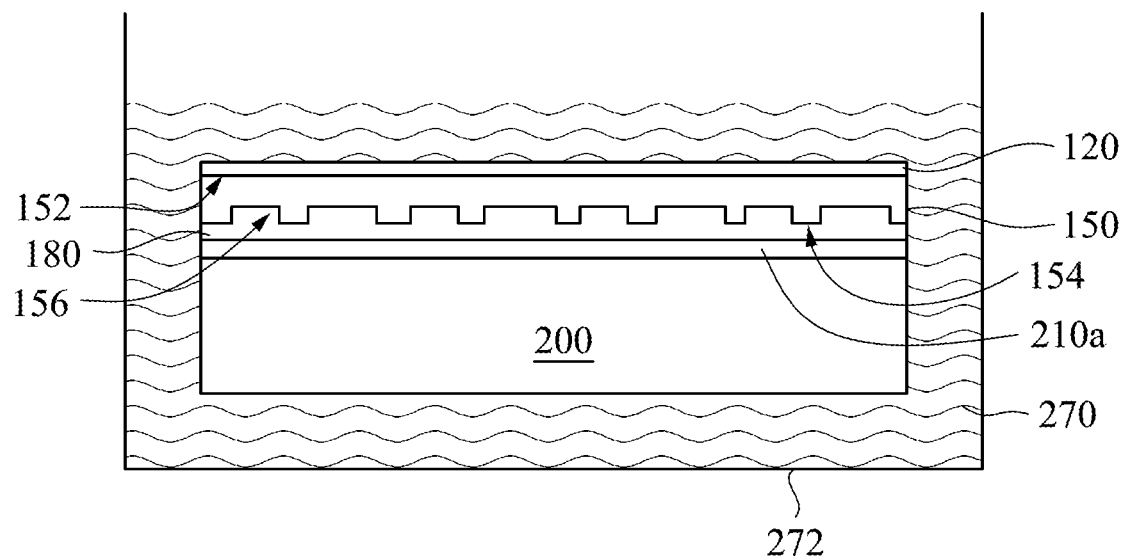
FIG. 15C is a schematic diagram showing performing a chemical soaking step on a bonding layer and a mold layer in accordance with still another embodiment of the present disclosure.

In still another examples, as shown in FIG. 15C, in the operation of removing the bonding layer 120 and the mold layer 150, a chemical soaking step is performed on the bonding layer 120 and the mold layer 150 by soaking the bonding layer 120 and the mold layer 150 with a chemical 270. For example, in the chemical soaking step, the stacked structure including light penetrating substrate 200, the adhesive layer 210a, the optical layer 180, the mold layer 150, and the bonding layer 120 is immersed in the chemical 270 in a container 272. After soaking with the chemical 270, the bonding layer 120 and the mold layer 150 can be removed from the optical layer 180. In some exemplary examples, the chemical 270 is a residue remover of the EKC series that is researched and developed by the DuPont EKC Technology company.

Referring to FIG. 16 continuously, the optical element 100 includes the light penetrating substrate 200, the adhesive layer 210a, and the optical layer 180. The optical layer 180 has a first surface 183 and a second surface 184 on two opposite sides of the optical layer 180. The optical layer 180 is located on a surface 202 of the light penetrating substrate 200. The adhesive layer 210a is sandwiched between the surface 202 of the light penetrating substrate 200 and the second surface 184 of the optical layer 180. After the mold layer 150 is removed from the first surface 183 of the optical layer 180, the first surface 183 is formed with diffracting optical structures 186. For example, each of the diffracting optical structures 186 may be a slanting structure, a binary structure, a stepped structure, a triangle structure, or a trapezoid structure.

Referring to FIG. 17 through FIG. 24, FIG. 25A, FIG. 26, FIG. 27A, and FIG. 28A are schematic diagrams of intermediate stages in a method for manufacturing of an optical element in accordance with one embodiment of the present disclosure. In the present embodiment, in the manufacturing of the optical element 100 shown in FIG. 16, the carrier 110 may be firstly provided. Optionally, before any material layer is formed on the carrier 110, a plasma cleaning step may be performed on the carrier 110 to use a plasma 280 to clean the carrier 110. For example, the plasma 280 may be an oxygen plasma. During the plasma cleaning step, products 282 are generated and are pumped out. The products 282 may be $H_2O$ and/or $CO_2$. In the example that the carrier 110 is clean, the plasma cleaning step can be omitted.

Figure 21:
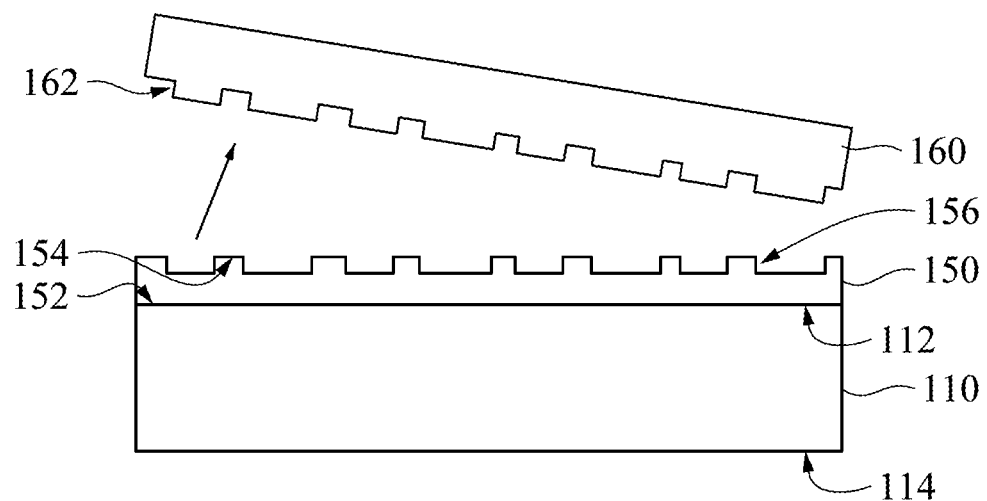

Next, the mold layer 150 shown in FIG. 21 may be directly formed on the surface 112 of the carrier 110. The first surface 152 and the second surface 154 of the mold layer 150 are opposite to each other, and the first surface 152 is adjacent to the carrier 110. For example, the first surface 152 may directly contact with the surface 112 of the carrier 110. The second surface 154 is set with the microstructures 156.

Figure 18:
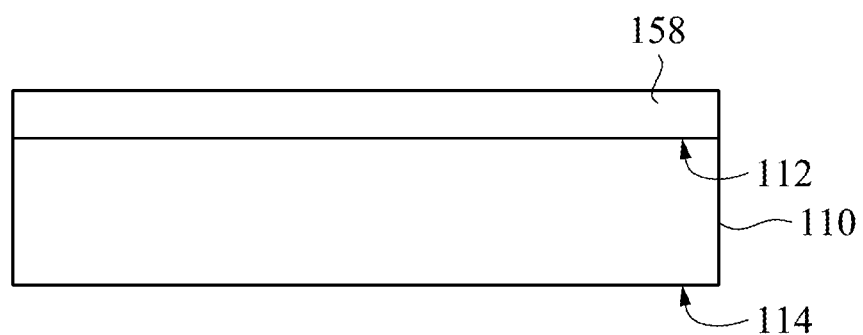
Figure 19:
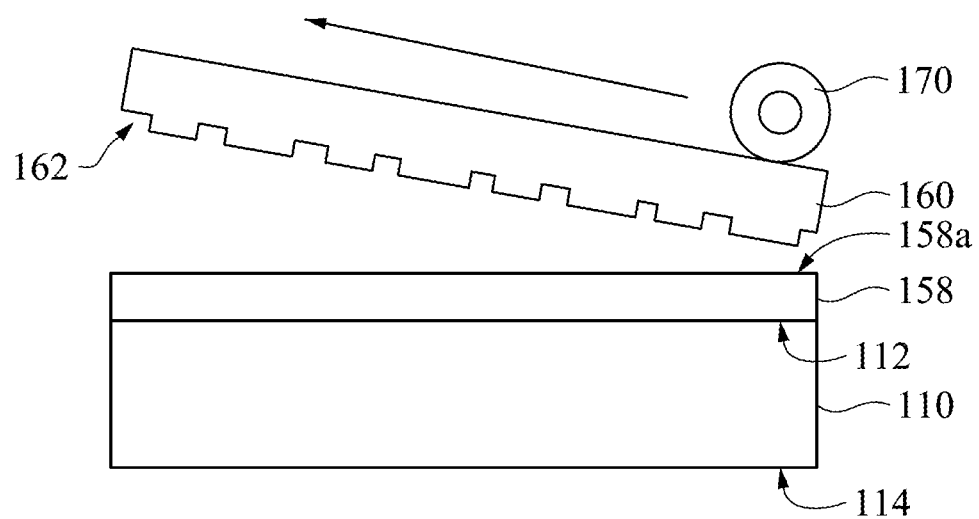
Figure 20:
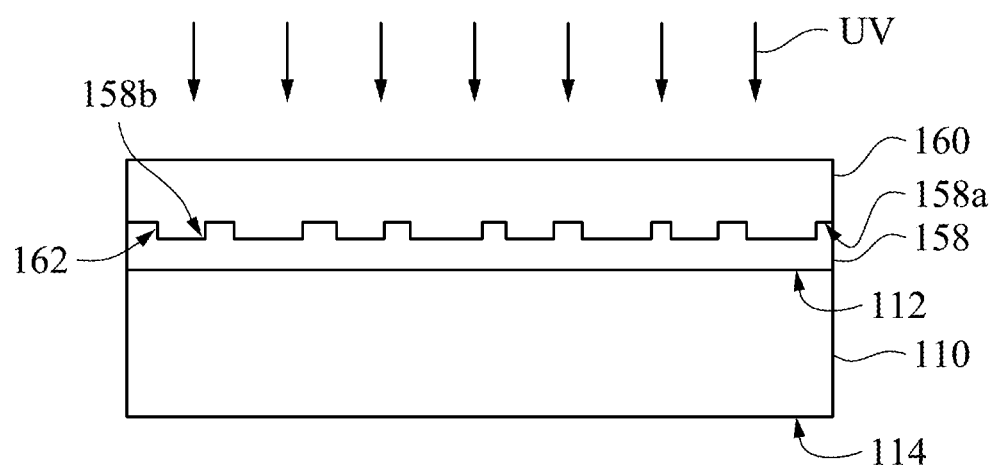

In some examples, as shown in FIG. 18, in the formation of the mold layer 150, the glue layer 158 may be firstly coated on the surface 112 of the carrier 110 by using, for example, a spin coating method. Then, the microstructures 156 are formed on the surface 158a of the glue layer 158, such that the mold layer 150 with the microstructures 156 is formed. In the forming of the microstructures 156, an imprinting step may be performed on the surface 158a of the glue layer 158 by using the imprinting mold 160. In the imprinting step, as shown in FIG. 19 and FIG. 20, the imprinting mold 160 is pressed on the surface 158a of the glue layer 158 while the glue layer 158 has not been hardened, such that a portion of the glue layer 158 is embedded in the pattern structure 162 of the imprinting mold 160. The imprinting step may be performed by using the roller 170 to press the imprinting mold 160 onto the surface 158a of the glue layer 158.

In some examples, as shown in FIG. 20, when the imprinting mold 160 is pressed on the surface 158a of the glue layer 158, the glue layer 158 is cured to maintain a shape of the surface 158a of the glue layer 158. After curing, the pattern structure 158b, which is opposite to the pattern structure 162 of the imprinting mold 160, is formed on the surface 158a of the glue layer 158. For ultraviolet light UV example, the glue layer 158 may be cured to perform an ultraviolet light exposure treatment on the glue layer 158. The glue layer 158 is cured by using an ultraviolet light UV to perform with a thermal curing treatment on the glue layer 158. Alternatively, the glue layer 158 may be cured by performing a thermal curing treatment on the glue layer 158. After curing, the imprinting mold 160 is removed to complete the formation the microstructures 156 of the mold layer 150, as shown in FIG. 21.

Figure 22:
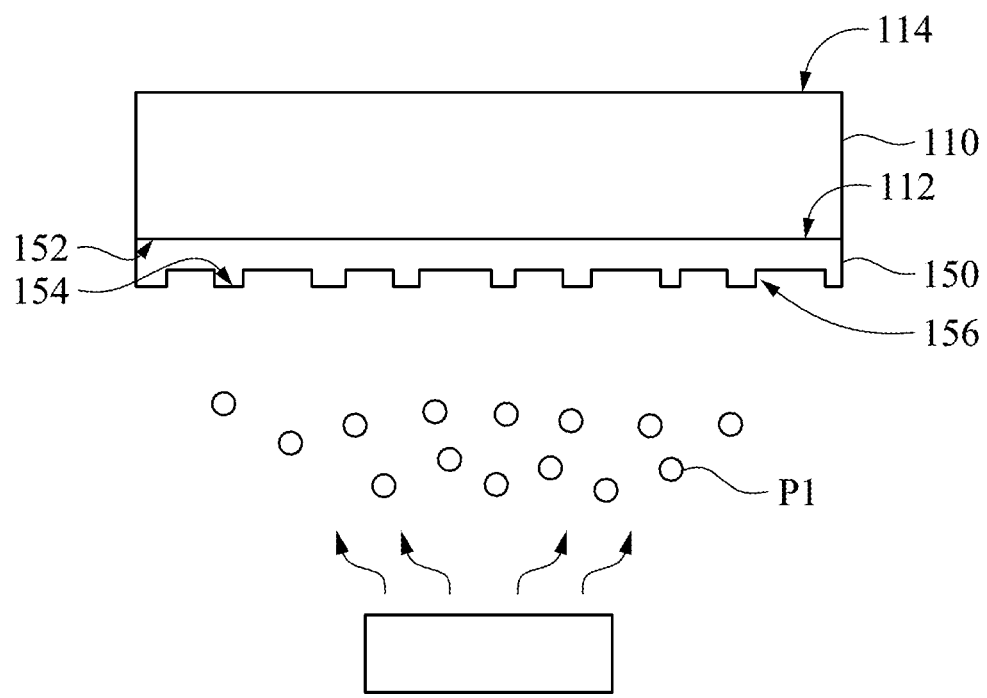

Then, an anti-sticking treatment may be performed on the second surface 154 of the mold layer 150. For example, as shown in FIG. 22, in the anti-sticking treatment, the stacked structure including the carrier 110 and the mold layer 150 may be flipped, and an anti-sticking material P1 may be then deposited on the second surface 154 of the mold layer 150 by using an evaporation method. In another example, in the anti-sticking treatment, a surface modification treatment is performed on the second surface 154 of the mold layer 150 by using, for example, plasma to make the second surface 154 have an anti-sticking property.

Figure 23:
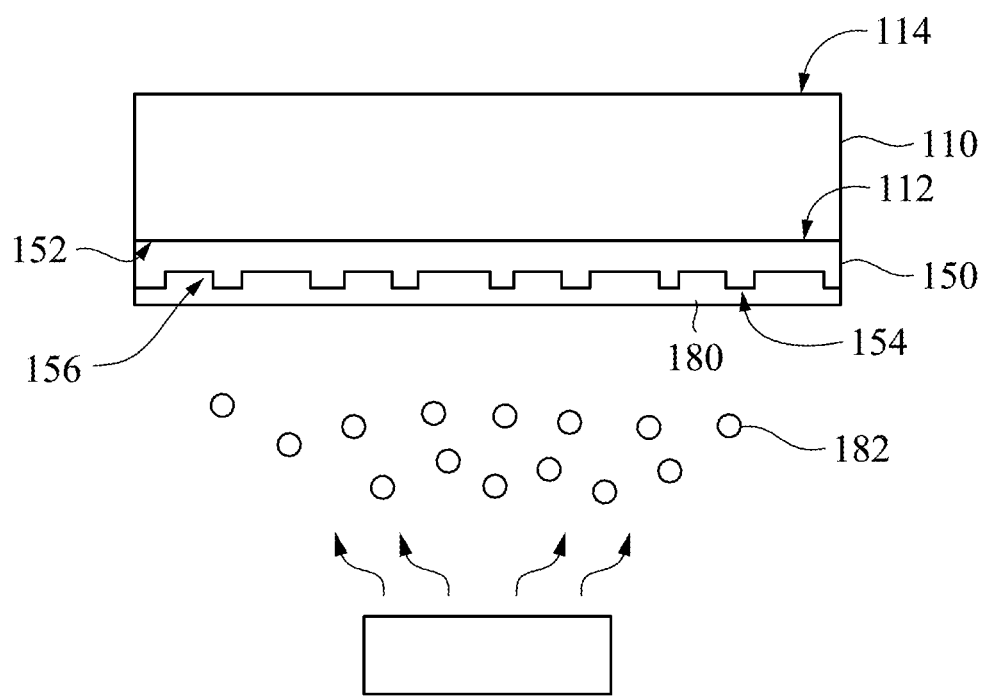

After the anti-sticking treatment, the optical layer 180 may be formed on the second surface 154 of the mold layer 150 by using, for example, an atomic layer deposition method, a sputtering method, an evaporation method, an imprinting method, or a spin coating method. As shown in FIG. 23, the optical layer 180 covers the microstructures 156 of the mold layer 150 and fills concaves of the microstructures 156, such that a surface structure, which is opposite to a topographical structure of the second surface 154 of the mold layer 150, is formed on the optical layer 180. In the forming of the optical layer 180, the optical material 182 is deposited on the second surface 154 of the mold layer 150. The optical layer 180 is formed from a high refractive index material. For example, a refractive index of the optical layer 180 may be ranging from substantially 1 to substantially 4.

Figure 24:
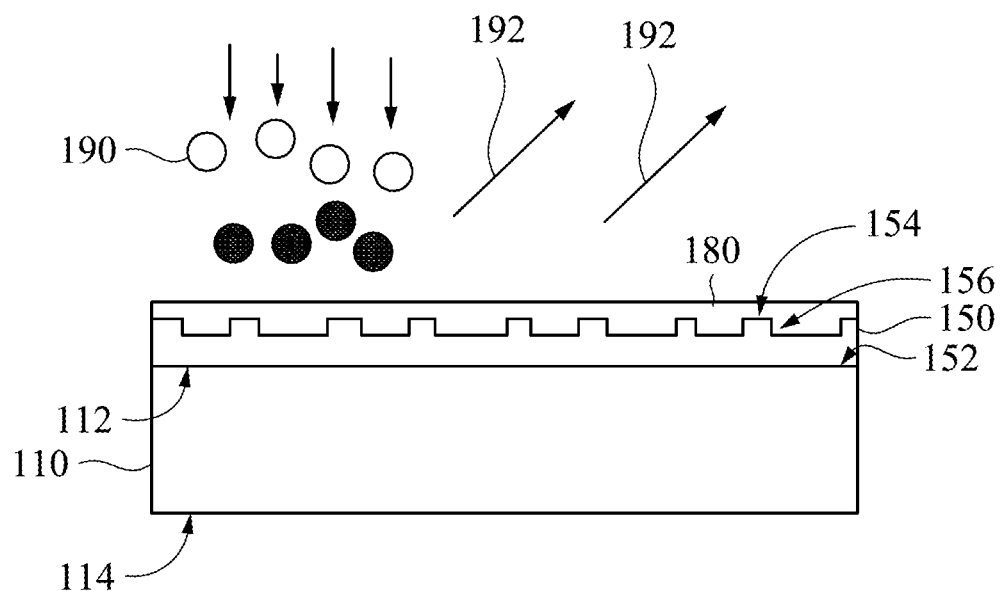

In some examples, after the optical layer 180 is formed, the stacked structure including the carrier 110, the mold layer 150, and the optical layer 180 is flipped. Then, as shown in FIG. 24, a plasma cleaning step may be optionally performed on the optical layer 180 to clean the optical layer 180. The plasma cleaning step is performed by using the plasma 190, such as an oxygen plasma. During the plasma cleaning step, the products 192 are pumped out. The products 192 may be $H_2O$ and/or $CO_2$.

Figure 26:
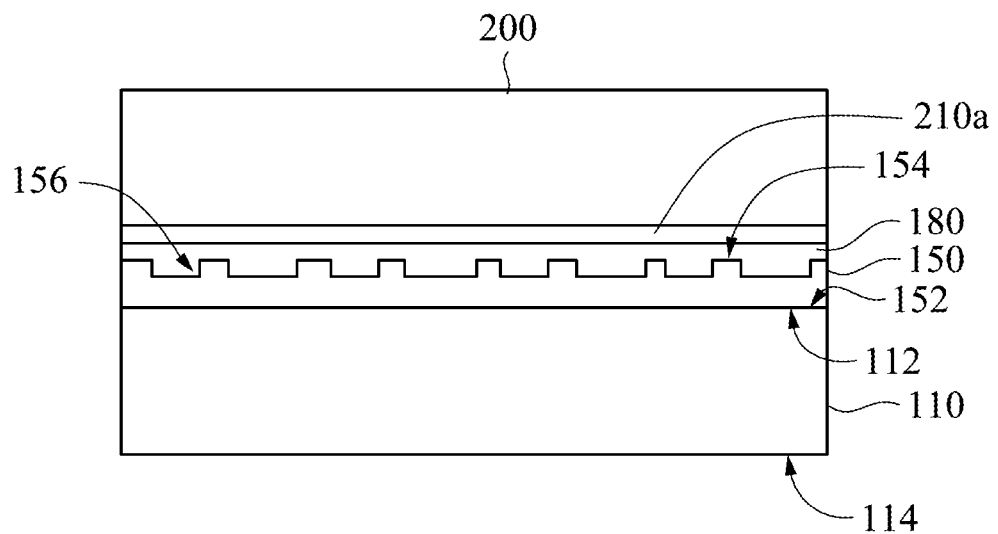

Subsequently, as shown in FIG. 26, the light penetrating substrate 200 may be adhered to the optical layer 180 by using the adhesive layer 210a. Thus, the optical layer 180 and the light penetrating substrate 200 are respectively located on two opposite sides of the adhesive layer 210a.

Figure 25A:
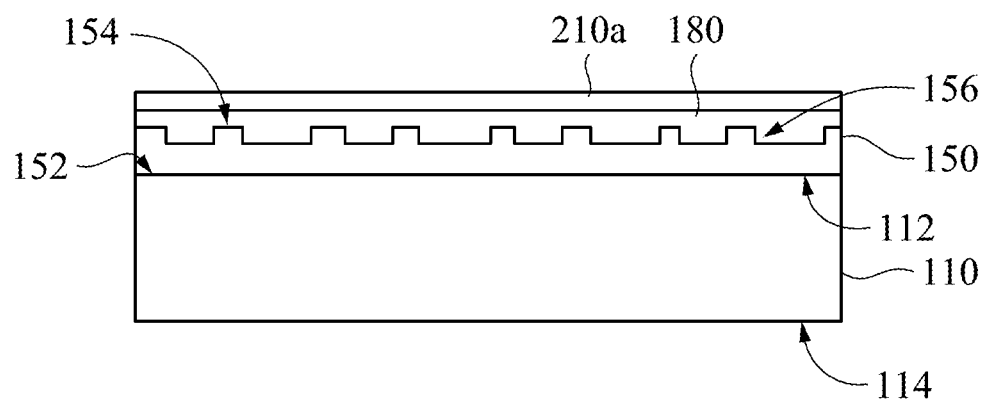

In some examples, as shown in FIG. 25A, in the operation of adhering the light penetrating substrate 200 to the optical layer 180, the adhesive layer 210a is firstly adhered to the optical layer 180, and the light penetrating substrate 200 is placed on and is adhered to the adhesive layer 210a. In the examples, the adhesive layer 210a is a double-sided tape. The adhesive layer 210a may include a pressure sensitive adhesive. A refractive index of the adhesive layer 210a may be ranging from substantially 1 to substantially 4.

Figure 25B:
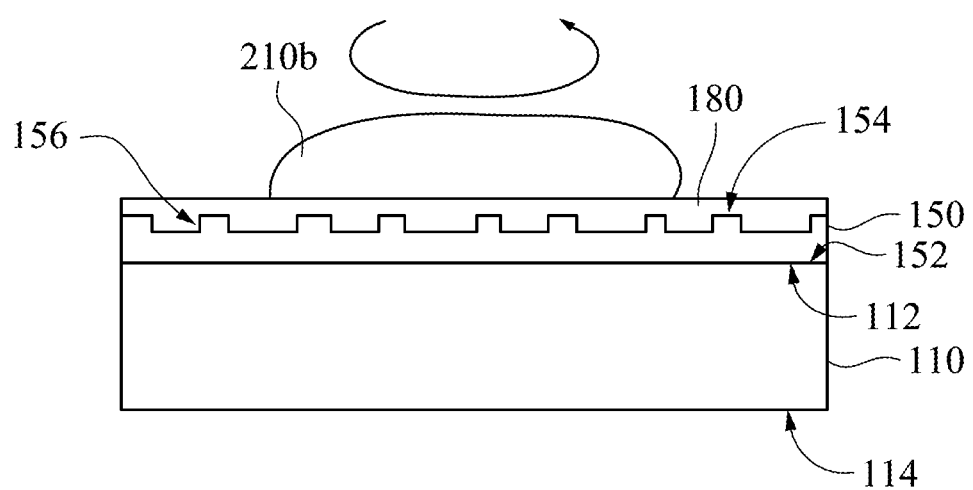
FIG. 25B is a schematic diagram showing forming an adhesive layer on an optical layer in accordance with another embodiment of the present disclosure.

In some examples, as shown in FIG. 25B, in the operation of adhering the light penetrating substrate 200 to the optical layer 180, the optically clear adhesive 210b is coated on the optical layer 180 to form the adhesive layer by using, for example, a spin coating method. Then, the light penetrating substrate 200 is placed on and is adhered to the adhesive layer composed of the optically clear adhesive 210b. A refractive index of the optically clear adhesive 210b may be ranging from substantially 1 to substantially 4.

Figure 27A:
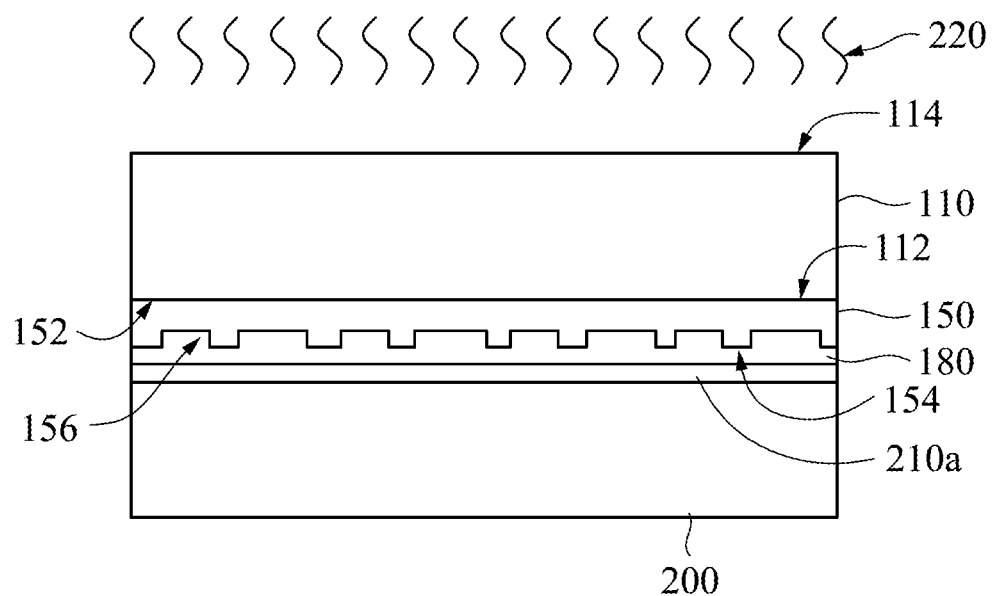

After the light penetrating substrate 200 is adhered to the optical layer 180, the carrier 110 is removed from the bonding layer 120. In some examples, as shown in FIG. 27A, in the operation of removing the carrier 110, a heat treatment 220 is performed to reduce a bonding force between the carrier 110 and the mold layer 150. After the heat treatment 220, the carrier 110 and the bonding layer 120 can be separated from each other easier.

Figure 27B:
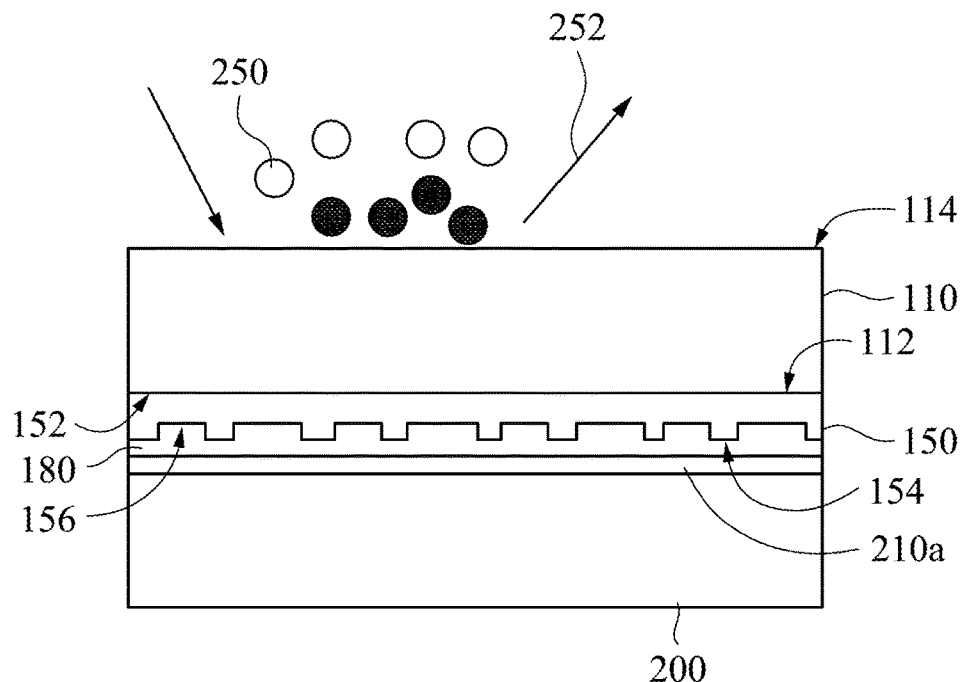
FIG. 27B is a schematic diagram showing performing an etching step on a carrier in accordance with another embodiment of the present disclosure.

In another example, as shown in FIG. 27B, in the operation of removing the carrier 110, an etching step is performed on the carrier 110 by using the etchant 250 to reduce the carrier 110 until the carrier 110 is removed. In the examples that the carrier 110 is formed from silicon dioxide, the etchant 250 may be hydrogen fluoride, and the products 252 generated during the etching step is silicon fluoride and water. In the examples that the carrier 110 is formed from calcium metasilicate, the etchant 250 may be hydrogen fluoride, and the products 252 silicon fluoride, water, and calcium fluoride.

Figure 28A:
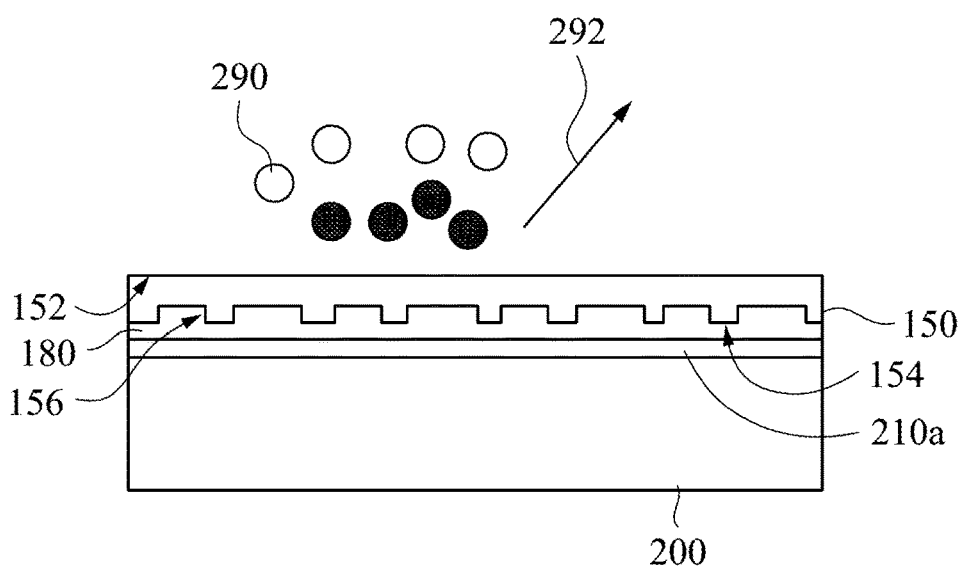

After the carrier 110 is removed, the mold layer 150 may be removed from the optical layer 180. In some examples, as shown in FIG. 28A, in the operation of removing the mold layer 150, an etching step is performed on the bonding layer 120 and the mold layer 150 by using an etchant 290 to etch away the mold layer 150. For example, the etchant 290 may include argon and chlorine. During the etching step, some products 292 are generated and are pumped out.

Figure 28B:
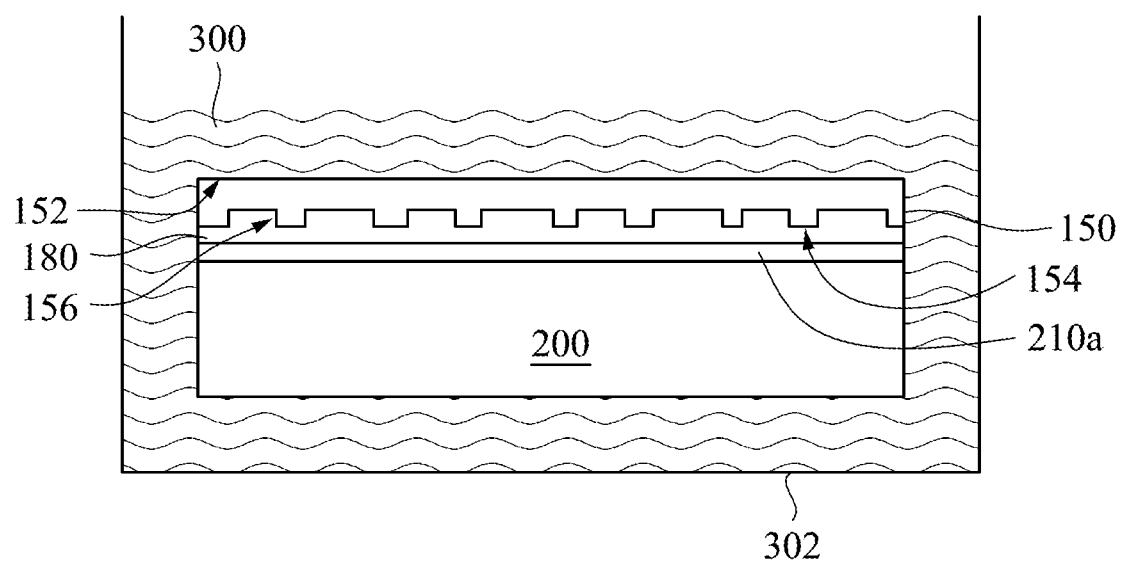
FIG. 28B is a schematic diagram showing performing a chemical soaking step on a bonding layer and a mold layer in accordance with another embodiment of the present disclosure.

In another examples, as shown in FIG. 28B, in the operation of removing the mold layer 150, a chemical soaking step is performed on the mold layer 150 by soaking the mold layer 150 with a chemical 300. For example, in the chemical soaking step, the stacked structure including light penetrating substrate 200, the adhesive layer 210a, the optical layer 180, and the mold layer 150 is immersed in the chemical 300 in a container 302. After soaking with the chemical 300, the mold layer 150 can be removed from the optical layer 180, so as to complete the formation of the optical element 100. In some exemplary examples, the chemical 300 is a residue remover of the EKC series that is researched and developed by the DuPont EKC Technology company.

According to the embodiments described above, one advantage of the present disclosure is that various diffracting optical structures are formed on an optical layer, which is made from a high refractive index material, such that the optical element with a higher diffraction angle is obtained.

The features of several embodiments are outlined above, so those skilled in the art can understand the aspects of the present disclosure. Those skilled in the art will appreciate that the present disclosure can be readily utilized as a basis for designing or modifying other processes and structures, thereby achieving the same objectives and/or achieving the same advantages as the embodiments described herein. Those skilled in the art should also understand that these equivalent constructions do not depart from the spirit and scope of the present disclosure, and they can make various changes, substitutions, and alteration without departing from the spirit and scope of the present disclosure.

What is claimed is:

1. A method for manufacturing an optical element, and the method comprising:
    providing a carrier;
    forming a mold layer on the carrier, wherein the mold layer has a first surface and a second surface, which are opposite to each other, the first surface is adjacent to the carrier, and the second surface is set with a plurality of microstructures;
    performing an anti-sticking treatment on the second surface of the mold layer;
    forming an optical layer on the second surface of the mold layer after performing the anti-sticking treatment, wherein the optical layer covers and fills the microstructures;
    adhering a light penetrating substrate to the optical layer using an adhesive layer, wherein the optical layer and the light penetrating substrate are respectively located on two opposite sides of the adhesive layer;
    removing the carrier from the mold layer; and
    removing the mold layer from the optical layer.

2. The method of claim 1, wherein forming the mold layer on the carrier comprises:
    coating a glue layer on the carrier; and
    forming the microstructures on a surface of the glue layer to form the mold layer.

3. The method of claim 2, wherein forming the microstructures on the surface of the glue layer comprises:
    performing an imprinting step on the surface of the glue layer to press an imprinting mold on the surface of the glue layer;
    curing the glue layer when the imprinting mold is pressed on the surface of the glue layer; and
    removing the imprinting mold.

4. The method of claim 3, wherein curing the glue layer comprises performing an ultraviolet light exposure treatment, an ultraviolet light exposure with thermal curing treatment, or a thermal curing treatment.

5. The method of claim 1, wherein between providing the carrier and forming the mold layer, the method further comprises attaching a bonding layer to a surface of the carrier, the mold layer is formed on the bonding layer, and removing the mold layer from the optical layer comprises performing a heating step, a laser ablation step, and/or an etching step on the bonding layer and the mold layer.

6. The method of claim 1, wherein between providing the carrier and forming the mold layer, the method further comprises attaching a bonding layer to a surface of the carrier, the mold layer is formed on the bonding layer, and removing the mold layer from the optical layer comprises performing a chemical soaking step to remove the bonding layer and the mold layer.

7. The method of claim 1, wherein performing the anti-sticking treatment comprises depositing an anti-sticking material on the second surface of the mold layer, or performing a surface modification treatment on the second surface of the mold layer.

8. The method of claim 1, wherein forming the optical layer comprises using an atomic layer deposition method, an etching method, a sputtering method, an evaporation method, an imprinting method, or a spin coating method.

9. The method of claim 1, wherein a refractive index of the optical layer is ranging from substantially 1 to substantially 4.

10. The method of claim 1, wherein between forming the optical layer and adhering the light penetrating substrate to the optical layer, the method further comprises performing a plasma cleaning step on the optical layer.

11. The method of claim 10, wherein performing the plasma cleaning step comprises using an oxygen plasma.

12. The method of claim 1, wherein adhering the light penetrating substrate to the optical layer using the adhesive layer comprises:

adhering the adhesive layer to the optical layer; and
adhering the light penetrating substrate to the adhesive layer.

13. The method of claim 12, wherein the adhesive layer comprises a pressure sensitive adhesive.

14. The method of claim 1, wherein adhering the light penetrating substrate to the optical layer using the adhesive layer comprises:

coating an optically clear adhesive on the optical layer to form the adhesive layer; and
adhering the light penetrating substrate to the adhesive layer.

15. The method of claim 1, wherein removing the carrier from the mold layer comprises:

performing a heat treatment to reduce a bonding force between the carrier and the mold layer; and
separating the carrier and the mold layer.

16. The method of claim 1, wherein removing the carrier from the mold layer comprises:

performing a laser ablation on a bonding layer, wherein the bonding layer is disposed between the carrier and the mold layer.

17. The method of claim 1, wherein removing the carrier from the mold layer comprises:

performing an etching step on the carrier to reduce the carrier.

18. The method of claim 1, wherein removing the mold layer from the optical layer comprises performing an etching step on the mold layer.

19. The method of claim 1, wherein removing the mold layer from the optical layer comprises performing a chemical soaking step to remove the mold layer.

20. The method of claim 1, wherein before forming the mold layer on the carrier, the method further comprises performing a plasma cleaning step on the carrier.

* * * * *